United States Patent
Rutherford et al.

(10) Patent No.: US 9,514,458 B2
(45) Date of Patent: Dec. 6, 2016

(54) CUSTOMER AUTHENTICATION IN E-COMMERCE TRANSACTIONS

(75) Inventors: Bruce Rutherford, Stamford, CT (US); Alfred Dagher, Wyckoff, NJ (US); Mark Wiseman, Chesterfield, MO (US); Didier Jean Marie Charles Paie, Rixensart (BE); Jean-Paul Edmond Rans, Glabais (BE); Fikret Ates, Namur (BE); John Wankmueller, Great Neck, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1745 days.

(21) Appl. No.: 10/560,192

(22) PCT Filed: Jun. 4, 2004

(86) PCT No.: PCT/US2004/017756
§ 371 (c)(1),
(2), (4) Date: Oct. 29, 2007

(87) PCT Pub. No.: WO2005/001618
PCT Pub. Date: Jan. 6, 2005

(65) Prior Publication Data
US 2008/0154770 A1    Jun. 26, 2008

Related U.S. Application Data

(60) Provisional application No. 60/475,639, filed on Jun. 4, 2003.

(51) Int. Cl.
*G06Q 20/00* (2012.01)
*G06Q 20/38* (2012.01)
(Continued)

(52) U.S. Cl.
CPC .......... *G06Q 20/3827* (2013.01); *G06Q 20/04* (2013.01); *G06Q 20/341* (2013.01);
(Continued)

(58) Field of Classification Search
USPC .......................................................... 705/64
See application file for complete search history.

(56) References Cited

U.S. PATENT DOCUMENTS 5,604,801 A    2/1997  Dolan et al.
5,859,419 A *  1/1999  Wynn ........................... 235/487
(Continued)

FOREIGN PATENT DOCUMENTS

CA      2293554       6/1998
EP      1014317       6/2000
(Continued)

*Primary Examiner* — John Hayes
*Assistant Examiner* — John M Winter
(74) *Attorney, Agent, or Firm* — Baker Botts L.L.P.

(57) ABSTRACT

A Chip Authentication Program based on 3-D Secure protocols is provided for authenticating customers' on-line transactions. An issuer, who may be a payment card issuer, operates Access Control and Authentication Request Servers for authenticating transactions by individual customers who are identified by their personal EMV-complaint smart cards. An authentication token is generated at the point of interaction (POI) for each transaction based on information from the customer's smart card and transaction specific information sent directly by the issuer to populate a web page at the POI. Authentication tokens generated at the POI are evaluated by the Authentication Request Server to authenticate individual customer and/or card presence at the transaction POI. Authentication values are transported on-line in designated Universal Cardholder Authentication Fields consistent with 3-D Secure protocols.

14 Claims, 11 Drawing Sheets

(51) Int. Cl.
*G06Q 20/04* (2012.01)
*G06Q 20/34* (2012.01)
*G06Q 20/40* (2012.01)
*G07F 7/10* (2006.01)

(52) U.S. Cl.
CPC ....... *G06Q 20/38215* (2013.01); *G06Q 20/40* (2013.01); *G06Q 20/40975* (2013.01); *G07F 7/1008* (2013.01); *G07F 7/1025* (2013.01)

(56) References Cited

U.S. PATENT DOCUMENTS

| | | | |
|---|---|---|---|
| 5,910,989 A | 6/1999 | Naccache | |
| 6,038,551 A | 3/2000 | Barlow et al. | |
| 6,173,400 B1 | 1/2001 | Perlman et al. | |
| 6,247,129 B1 | 6/2001 | Keathley et al. | |
| 6,269,445 B1 | 7/2001 | Nishioka et al. | |
| 6,282,522 B1 | 8/2001 | Davis et al. | |
| 6,453,416 B1 | 9/2002 | Epstein | |
| 6,990,471 B1* | 1/2006 | Rajaram | 705/64 |
| 7,478,434 B1* | 1/2009 | Hinton et al. | 726/27 |
| 2004/0019564 A1* | 1/2004 | Goldthwaite et al. | 705/44 |
| 2004/0044739 A1* | 3/2004 | Ziegler | 709/213 |

FOREIGN PATENT DOCUMENTS

| | | |
|---|---|---|
| GB | 2374498 | 10/2002 |
| WO | WO 01/72075 | 9/2001 |
| WO | WO 02/01520 | 1/2002 |

* cited by examiner

CUSTOMER AUTHENTICATION IN E-COMMERCE TRANSACTIONS

CROSS-REFERENCE TO RELATED APPLICATION

This application is a national phase of International Application Serial No. PCT/US04/017756, filed Jun. 4, 2003, published Jan. 6, 2005, which claims the benefit of U.S. provisional patent application Ser. No. 60/475,639, filed on Jun. 4, 2003, each of which are incorporated by reference in their entireties herein, and from which priority is claimed.

BACKGROUND OF INVENTION

The present invention relates to systems and methods for authenticating transactions conducted by parties over open electronic networks such as the Internet. In particular, the invention relates to authentication of Internet transactions in which customers charge payments to credit or debit cards.

E-commerce is now popular. Conducting transactions over electronic networks such as the Internet has the now oft-stated advantages of convenience, lower costs, market reach and choice, for both merchants and customers. However, the anonymity of the Internet brings to a commercial or retail sale the issues of fraud and misuse. A transacting merchant has a desire to authenticate the sale, certify the sale, confirm the sale, ensure non-repudiation of the sale, ensure payment, and control anonymity. Similarly, a buyer has a desire to control authentication of the sale, integrity of the sale, recourse of a bad sale, confirmation of the sale, privacy, and anonymity.

Commonly invented and co-owned International patent application WO03073389, which is hereby incorporated by reference in its entirety herein, describes a network payment system for authenticating the customer in a customer-merchant transaction conducted over the Internet. The Internet links a merchant server and a customer terminal to a payment server. The customer uses an Integrated Circuit Card (ICC) as an identification device. The ICC is in communication with the customer terminal via a card reader. The ICC generates a cryptogram in response to information about a pending transaction. This information may be a challenge message generated by the customer terminal. The card reader converts a portion of the cryptogram generated by the ICC into a unique authentication token, which then can be transmitted over the Internet, for example, to the payment server, to authenticate the customer.

Another Internet payment system, which relies on a "smart" chip card for payment of goods and/or services purchased over the Internet, is described in Davis et al. U.S. Pat. No. 6,282,522. The ICC and other smart cards may be based on common industry specifications (e.g., EMV standards developed jointly by Europay International, Mastercard International and Visa International) to enable interoperability across various payment systems.

Card issuers and other financial institutions now offer or use standardized Internet transaction protocols to improve on-line transaction performance and to accelerate the growth of electronic commerce. Under some standardized protocols (e.g., 3-D Secure™ Protocol developed by Visa International) card issuers or issuing banks may authenticate transactions thereby reducing the likelihood of fraud and associated chargebacks attributed to cardholder not-authorized transactions. The presence of an authenticated transaction may result in an issuer assuming liability for fraud should it occur despite efforts to authenticate the cardholder during an online purchase. Merchants are assured by card issuers or issuing banks that they will be paid for issuer-authenticated transactions. The 3-D Secure™ protocol is consistent with and underlies the authentication programs offered by card issuers (e.g., Verified by Visa or MasterCard SecureCode™) to authenticate customers for merchants during remote transactions such as those associated with the Internet. The 3-D Secure™ Protocol leverages existing Secure Sockets layer (SSL) encryption functionality and provides enhanced security through issuer authentication of the cardholder during the online shopping session. A piece of software called the Merchant Plug In (MPI) is used by participating merchants to exchange messages, pass information and query participants in order to establish an authentication session between the cardholder and their card issuer during an online purchase.

The 3-D Secure Protocol services are based on a three-domain model—the issuer domain, acquirer and interoperability domain. The issuer is responsible for managing the enrollment of cardholders in the service, and for authenticating cardholders during on-line transactions. The Acquirer is responsible for defining procedures so that merchants participating in Internet transactions operate under an agreement with the Acquirer, and for providing back end processing for authenticated transactions. The Interoperability domain facilitates the transaction exchange between the other two domains with a common protocol and shared services. Cardholders and their banks may come under "Issuer Domain", merchants and their banks may come under the "Acquirer Domain". Communication between issuing and acquiring banks or financial institutions and card issuer infrastructure may come under "Interoperability Domain". While transacting with 3-D Secure compliant banks and merchants, a consumer may have the same Internet shopping experience as previously, except that there is a separate authentication window or pop-up screen from the cardholder's bank to determine if the transacting party is indeed the cardholder of record. The transaction flow for an on-line Internet purchase transaction under the protocol may be as follows:

(1) Customers fill in payment data at Merchant web sites in the usual fashion, via an encrypted Secure Sockets Layer (SSL) connection.

(2) The Merchant then sends a message through an MPI to a Directory which in turn queries the card issuer to find out whether the customer is enrolled in the 3-D Secure program.

(3) The card issuer responds to the Directory with a message indicating whether the cardholder is enrolled and, if so, provides a Web address for the bank that issued the card. This message is then processed and a response forwarded to the Merchant.

(4) The Merchant then sends a message to the issuing bank, through the cardholder device, to initiate and authentication session between the cardholder and the card issuer in which transaction details such as Merchant name and transaction amount may also be presented to the cardholder for confirmation.

(5) The issuing bank will then populate an authentication window to the cardholder detailing information related to the transaction such as Merchant name and amount, a personal security message, and a response area where authentication details can be entered by the cardholder.

(6) The customer approves the transaction in one of a variety of ways, depending on how the issuing bank chooses to implement the system. Options may range from entering a static password or PIN to utilizing a smart card and a Personal Card Reader (PCR) to generate an authentication token.

(7) If the authentication is valid, the issuer sends a message to the merchant indicating the transaction was successful. The issuer also notifies the merchant if the authentication failed or was unable to be completed.

Consideration is now being given to ways of enhancing solutions for authenticating customers, who use credit cards or debit cards for payment in electronic transactions. Attention is directed to solutions for securing the merchant's Internet sales channel by authenticating the cardholder at the point-of-interaction (POI) and to generating explicit evidence of the presence of both the card and the cardholder at the POI. The desirable solutions should be compatible with industry implementations of common protocols like 3-D Secure and other industry standards such as the EMV standard for smart cards to strength authentication beyond simple and static passwords or PINs.

SUMMARY OF THE INVENTION

In accordance with the present invention, a Chip Authentication Program (CAP), based on the 3-D Secure protocol, is provided for authenticating customer transactions in e-commerce. Implementations of CAP, which may be layered on top of existing e-commerce infrastructure and techniques, provide a seamless integration of both EMV and 3-D Secure technologies to obtain stronger authentication than conventional static password solutions. The CAP implementations provide a mechanism for on-line merchants to receive global payment guarantees from payment card issuers that are similar to the guarantees that brick-and-mortar retailers enjoy with physical point-of-sale transactions in which a customer's identity is readily verified.

In CAP, an issuer (e.g., a payment card issuer) provides authentication services to parties on a transaction-by-transaction basis. The issuer may operate an Access Control Server and an associated Authentication Request Server for authenticating transactions by customers who have been enrolled in the program. An authentication token is created at the point of interaction (POI) for each transaction for which authentication is requested based on encrypted information that uniquely identifies the customer and the transaction. A transacting customer uses an EMV-based authentication application embedded in an Integrated Circuit Chip card (ICC) as a personal identifier at the POI for creation of the token. Merchant or transaction-specific information for inclusion in the token can be supplied by the issuer directly to the POI, for example, by populating a web page of a usual Internet browser at the POI. The CAP implementations advantageously do not require separate merchant-specific software downloads or displays (e.g., applets) at the POI (e.g., on the customer's access device).

Authentication tokens generated at the POI are evaluated by the ARS to authenticate customer and/or card presence at the transaction POI. On completion of the evaluation, an AAV is generated by the ACS. This AAV is transported over the electronic network in an UCAF in a format, which is consistent with 3-D Secure protocols.

Preferably, a system of the present invention for authenticating a customer transaction on an electronic network, includes an network access device, an integrated circuit chip that is issued to the customer and contains customer-identifying data, a reader that is linkable (physically, electronically or via manual mediation of the cardholder) to the access device and can communicate with the chip, an authentication request server (ARS) and an Access Control Server (ACS) that are linked to the electronic network and can communicate with a party requesting authentication of the transaction. The ACS is configured to communicate directly with the customer's access device (e.g., via a Cardholder Authentication Page) for authentication of the transaction. This direct communication makes unnecessary authentication software downloads (e.g. merchant—specific applets) from the requesting party (e.g., merchants) to the customer's access device. The ARS receives transaction information from the requesting party and communicates transaction data to the reader via the customer's access device. The reader may process the transaction data and communicate a value based on the transaction data to the chip. The chip has an authentication application to generate a cryptogram based on at least a portion of the transaction data and at least a portion of the customer-identifying data on the chip. The reader can generate and communicate an authentication token based on the cryptogram to the ARS, which is configured to evaluate customer-identifying data from the authentication token and to accordingly validate the authentication token. The authentication token may be in a format that is compatible with 3-D Secure protocol message formats. Upon successful completion of evaluation of the authentication token, the ACS generates an AAV, which is transported on the electronic network in an UCAF, which has a 20-byte length.

The ARS evaluates customer-identifying data from the authentication token by first rebuilding the data used by the chip to generate the cryptogram, next to generating a replica or regenerated cryptogram from rebuilt data, and then matching the authentication token with the replica cryptogram.

Preferably, the method of the present invention for remote authentication of a customer who participates in an electronic transaction using a network access device, includes providing the customer with an integrated circuit chip that has customer-identifying data, and providing a reader that is linkable to the customer's network access device and can communicate with the chip. The method further includes using an authentication request server (ARS), which is linked to the electronic network and can communicate data to the reader, to receive transaction specific information and to communicate transaction specific data to the reader, using the reader to communicate the transaction specific data to the chip and to instruct the chip to generate a cryptogram based on at least a portion of the transaction specific data and at least a portion of the customer-identifying data, and using the reader to generate an authentication token based on at least part of the cryptogram generated by the chip. The method additionally involves using the ARS to validate authentication token and accordingly generating an AAV for transport over the electronic network in an UCAF message to the issuer.

Further features of the invention, its nature and various advantages will be more apparent from the accompanying drawings and the following detailed description.

BRIEF DESCRIPTION OF THE DRAWINGS

Further features of the invention, its nature, and various advantages will be more apparent from the following detailed description and the accompanying drawings, wherein like reference characters represent like elements throughout, and in which.

Throughout the figures, unless otherwise stated, the same reference numerals and characters are used to denote like features, elements, components, or portions of the illustrated embodiments.

DETAILED DESCRIPTION OF THE INVENTION

Figure 1:
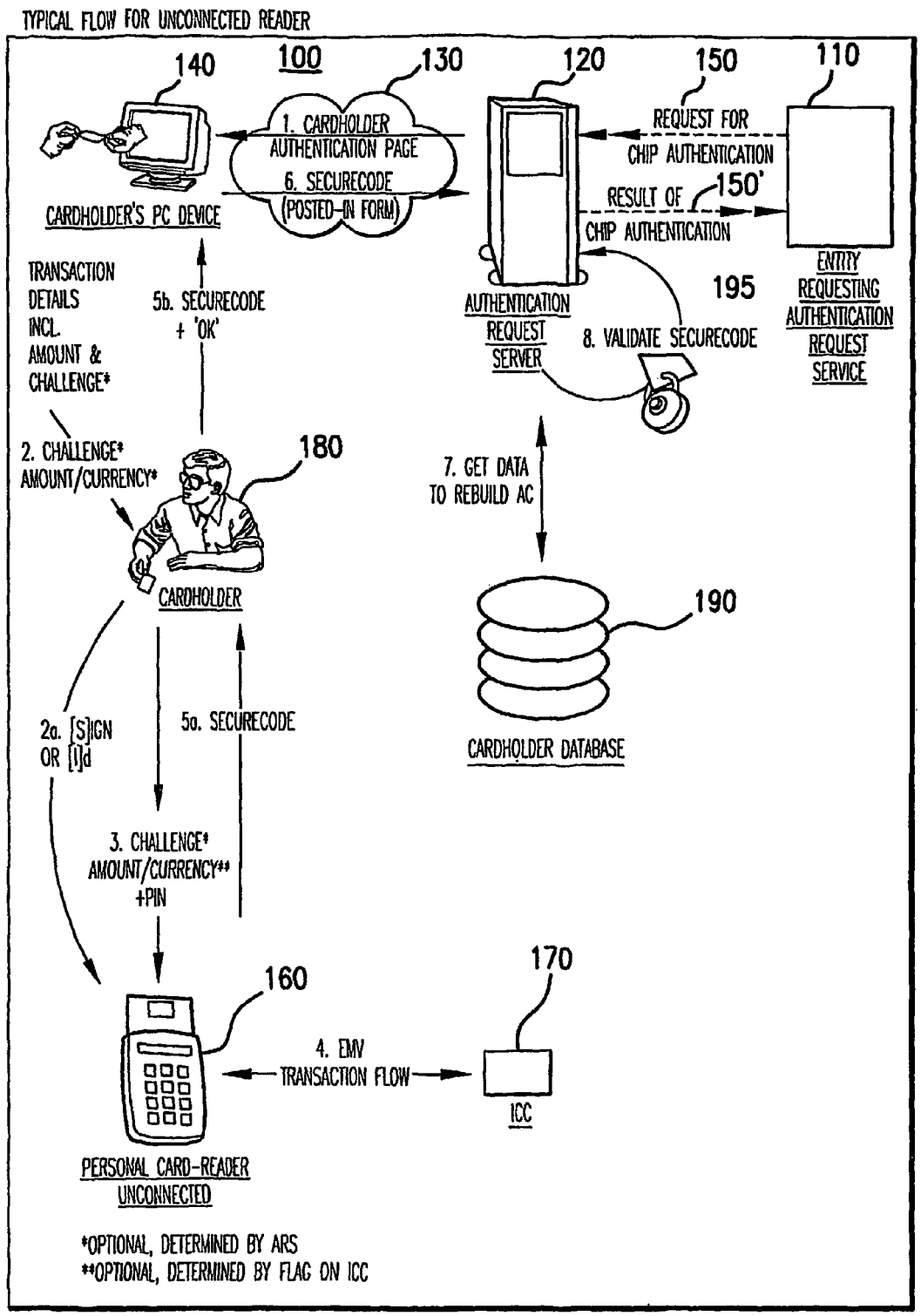
FIGS. 1 and 2 are schematic illustrations of exemplary implementations of Chip Authentication programs and process flows, in accordance with the principles of the present invention.

The present invention provides solutions for authenticating remote parties in an electronic transaction. In particular, the solutions relate to authenticating a cardholder who remotely participates in the electronic transaction. The solutions also relate to authentication in the context of electronic transactions conducted on industry standard e-commerce platforms, such as 3-D Secure compliant e-commerce platforms, and also may relate to transactions in the context of non e-commerce environments such as Mail Order and Telephone Order or mobile devices where an authentication token can be used by the issuer to authenticate the cardholder.

A solution, the "Chip Authentication Program (CAP)," gives prominence to the card issuer or issuing bank as the authenticating entity. This entity may operate an Access Control Server and an associated Authentication Request Server for authenticating customers who have been enrolled in the program. CAP utilizes an EMV-based authentication application embedded in integrated circuit chip cards (e.g., ICC), which are issued to enrolled cardholders. A cardholder may use the EMV-based authentication application in the ICC during an on-line transaction to obtain remote authentication for the specific transaction. The authentication application may be separate from or in addition to other traditional EMV payment applications in chip cards that are designed for face-to-face merchant-customer transactions.

The cardholder may use the ICC in conjunction with a Personal Card Reader (PCR) to generate a dynamic "secure code" or authentication token for one-time use. A Cardholder Authentication Page may be generated and displayed at the cardholder's Internet access device for this purpose (e.g., to receive the secure code). The Cardholder Authentication Page may be entirely controlled by the issuer's Access Control Server with out any particular need for other preinstalled or additional software on the cardholder devices. CAP may be implemented as an alternate or in addition to other security solutions for authenticating cardholders. The other security solutions may, for example, include authentication via static passwords. It will be understood that CAP may be implemented using any standard chip technology for smart cards. The implementation, however, is preferably made using the standard EMV chip technology.

CAP can provide a trusted mechanism for the authentication of e-commerce payment and issuer services. CAP may utilize traditional authorization routes through common payment system networks for payment transaction authorization. One version of CAP is compatible with 3-D Secure version 1.0.2 infrastructure for end-to-end interoperability between merchant, acquirer and issuer systems, all of which now by commonly agreed industry standards must support the 3-D Secure infrastructure.

International patent application WO03073389, incorporated by reference, describes an ICC Authentication Programme using a Personal Card Reader (PCR), which generates authentication tokens for transport to an Issuer in a Universal Cardholder Authentication Field (UCAF) leveraging a series of MasterCard-defined hidden Hypertext Markup Language (HTML) fields at the merchant rather than 3-D Secure technology to exchange authentication data between the issuer, cardholder and merchant. It will be understood that generally the same terms, acronyms and abbreviations that are defined the referenced application are used in the present description. To aid the understanding of the present invention, a terminology list and other portions of the referenced application are reproduced herein.

Terminology:
AAC Application Authentication Cryptogram
AAV Accountholder Authentication Value
AC Authentication Cryptogram
AFL Application File Locator, identifies what records are available where in the ICC.
AID Application Identifier, the hex string which identifies a given application in the ICC.
AIP Application Interchange Profile, indicates the capabilities of the ICC to support specific functions.
APDU Application Processing Data Unit, the messages sent between ICC and some external application.
ARQC Application Request Cryptogram
ATC Application Transaction Counter
BCD Binary Coded Decimal
Big-Endian An encoding style where a value is stored with its most significant byte first followed by each successive byte, with the least significant byte stored last.
CAP Chip Authentication Programme
CDOL Card risk management
CID Cryptogram Information Data
CSN Card Sequence Number
CVC2 Card Verification Code CVM Cardholder Verification Method, the method used to verify a cardholder to the card.
DAC Dynamic Authentication Cryptogram
DOM Document Object Model, the programmatic view of the current HTML page supplied by a browser to a plug-in.
HHD Hand held device, e.g. a card reader
EMV Europay MasterCard Visa
IA Interface Application
IAD Issuer Application Data
IAF Internet Authentication Flags, the first byte of the IIPD.
ICC Integrated Circuit Card, also known as Chipcard or Smartcard.
IIPB Issuer Internet Proprietary Bitmap, identifies bits required to be sent to the Issuer in order to validate the AC.
IIPD Issuer Internet Proprietary Data, proprietary data used by the Issuer in relation to computing a cryptogram for the purposes of Internet related transactions.
ITV Interactive Television
LATC Lower (byte of) Application Transaction Counter
Little-Endian An encoding style where a value is stored with its least significant byte first followed by each successive byte, with the most significant byte stored last.
MAC Message Authentication Code. A cryptographic signature calculated over data items in a message to both prove the origin of the message and to allow detection of whether those data items have been modified.
MCD Main Cardholder Device, the device on which the browsing and/or ordering and/or payment is being performed on.
Nibble Half a byte i.e. 4 bits.
PI Parameter 1, of an APDU, it effectively customizes the command being sent to the ICC.
PAN Primary Account Number PC Personal Computer PCR Personal Card-reader.
Cardholder IA Cardholder Interface Application, the application running on the MCD, which interfaces, between the authentication requester, the Cardholder and the PCR.
PDA Personal Digital Assistant
PDOL Processing Options Data Object List, the list of processing options available to/supported by the terminal (i.e. PCR).
PIN Personal Identification Number
SPA Secure Payment Application
TLV Tag Length Value
UCAF Universal Cardholder Authentication Field
UN Unpredictable Number The Authentication scheme described in WO03073389 is a use of the Universal Cardholder Authentication Field (UCAF). It comprises the following elements: Issuer Provided Chip-UCAF-Enabled interface application, Chip-UCAF Accountholder Authentication Value (AAV) generation, Cardholder authentication, Merchant presentation, collection and processing of AAV Data in the UCAF, Authentication Data Field, Acquirer acceptance and processing of AAV Data as contained in the UCAF, Banking network development to include support of carrying the AAV data in the UCAF Authentication Data Field, and Authorization support of AAV data in the UCAF Authentication Data Field.

The following entities are involved in the lifetime of a Chip-UCAF authentication transaction:

Cardholder—The cardholder initiates the transaction and is responsible for entering data into both the merchant's payment web pages, the Cardholder, Interface Application, and the Personal Card-Reader.

Merchant—The merchant supplies, e.g. from a merchant server in communication with the Internet, the data necessary to start the authentication transaction and receives the resultant UCAF data to forward, via their acquirer, to the card issuer for approval.

Cardholder Interface Application—The Cardholder IA detects the relevant data supplied by the merchant and interacts with the cardholder directly and indirectly, through the cardholder, with the Personal Card-reader. The Cardholder IA creates the AAV and UCAF and populates the merchant's page with the appropriate data. For example, the Cardholder IA can run as part of an Internet browser on the main cardholder device (MCD) being used to access the merchant on the Internet.

Personal Card-Reader—The PCR interacts with the Cardholder, and the ICC to produce an authentication token that is passed, indirectly, to the Issuer. The ICC—the chip card authenticates the Cardholder through the use of submitted PIN verification and generates a suitable cryptogram based on data supplied by the PCR.

Acquirer—An acquirer accepts the formatted UCAF data from a merchant, e.g. at an acquirer server, and forwards it, with an indicator of the use and presence of UCAF data, to the issuing bank via the appropriate telecommunications network.

Mastercard is an acquirer.

Issuer—The card issuer distributes PCRs to those cardholders that are signed up to the Chip-UCAF scheme. The issuer maintains an issuer server platform in communication with the Internet. In accordance with the present invention the Issuer server validates the authentication token encoded into the UCAF, transmitted in the authorization request by an acquirer, according to the rules of that issuer.

According to WO03073389, the UCAF (Universal Cardholder Authentication Field) data field is a multipurpose data transport area in a digital message to allow communication of authentication data to an Issuer from an Acquirer over any form of telecommunications network. For example, the UCAF can be a 32-character field (24 bytes-1 control byte and 23 data bytes—that are base-64 encoded to become 32 characters) with a flexible data structure that can be tailored to support the needs of a variety of Issuer security and authentication requirements. For example, ISO 8583 Data Element 48, sub-element 43 may be designated to contain the UCAF. The term UCAF also extends to referring to the interface defined to pass data between the Merchant and the MCD and back again, i.e. the field names in the specification for any given channel. The UCAF can contain a 24-byte user authentication token. These 24 bytes are preferably encoded, e.g. Base64 encoded, by the Cardholder IA to give 32 ASCII characters of data that are returned to the Merchant. The Merchant passes the UCAF data, in their proprietary communications with the Acquirer who can then populate the UCAF in the Authorization Request message sent to the Issuer.

The Accountholder Authentication Value (AAV) is the term given to a part, e.g. the 23 bytes, of UCAF application specific data. Each UCAF application is responsible for determining the appropriate structure for its AAV. Every instance of an implementation of a given UCAF application must use that application's AAV structure in a consistent manner, i.e. the AAV format is standardized for a given UCAF application.

In order to use the Chip-UCAF cardholder authentication scheme the cardholder needs to have an appropriate ICC payment card and a Personal Card-reader. The PCR will be supplied to the cardholder by their card issuer, who will register that that cardholder has a PCR and is 'enrolled' in the Chip-UCAF cardholder authentication scheme. The UCAF transaction data supplied by the Merchant is used for display purposes and some of it is used in generating a transaction related PCR Challenge. There is no additional processing that Merchants need to perform on the AAV data within the UCAF response. This is indicated to the Merchant through the UCAF Control Byte value being set to the value for Chip-UCAF. The Cardholder Interface Application (Cardholder IA) provides the interaction between the authentication requirer (Merchant), the cardholder and the PCR. The Interface Application presents the secure face of the present UCAF scheme to the cardholder. It is responsible for presenting the transaction data to the cardholder, generating the challenge transferred to the PCR, receiving the PCR Token response, formatting the UCAF and populating the return data for the given channel. The Cardholder IA has a minimum set of requirements it must meet in order to effect a Chip-UCAF transaction.

In the context of the present invention, the UCAF enabled Acquirer has a relationship with a UCAF enabled merchant. The acquirers enable their merchants to pass the extra UCAF data to the acquiring systems and enable their systems to identify the presence of and pass on supplied UCAF data to the issuing bank. The Issuer Host, or some other element acting, to the scheme, as the Issuer Host is responsible for taking the data passed in the authorization network message, including the data in the UCAF, and enabling the authentication token to be validated.

Figure 10:
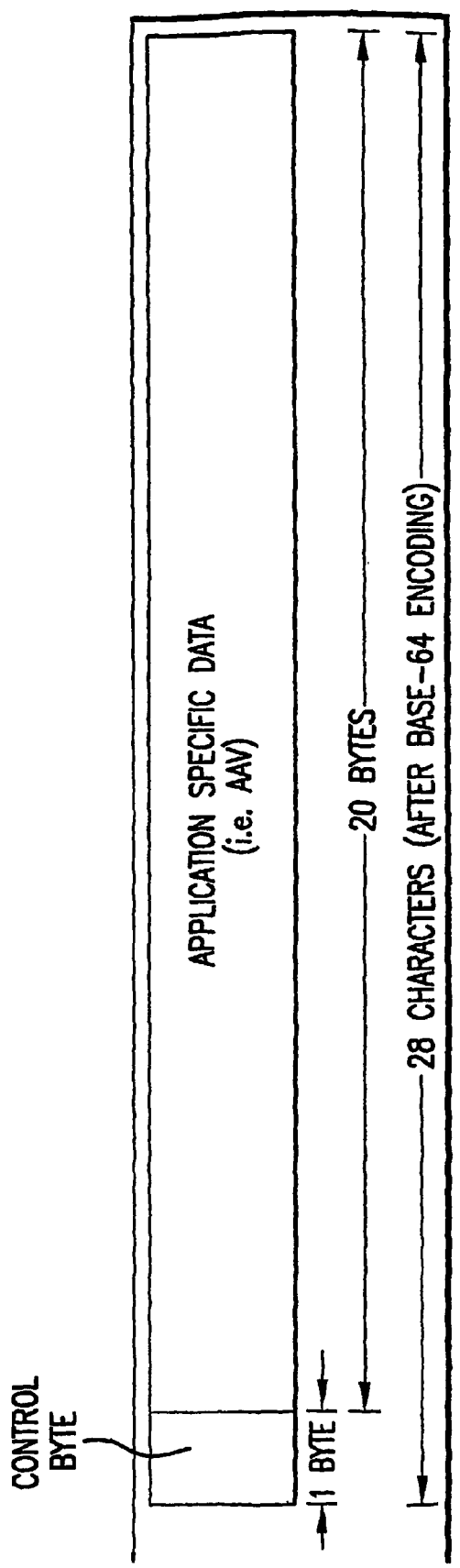
FIG. 10 is an illustration of a 3-D Secure compatible UCAF Structure with the principles of the present invention

A UCAF, which in accordance with the present invention conforms to 3-D Secure protocols, can contain at most a 20-byte user authentication token. The structure of such a 3-D Secure compliant UCAF is shown in FIG. 10.

Figure 2:
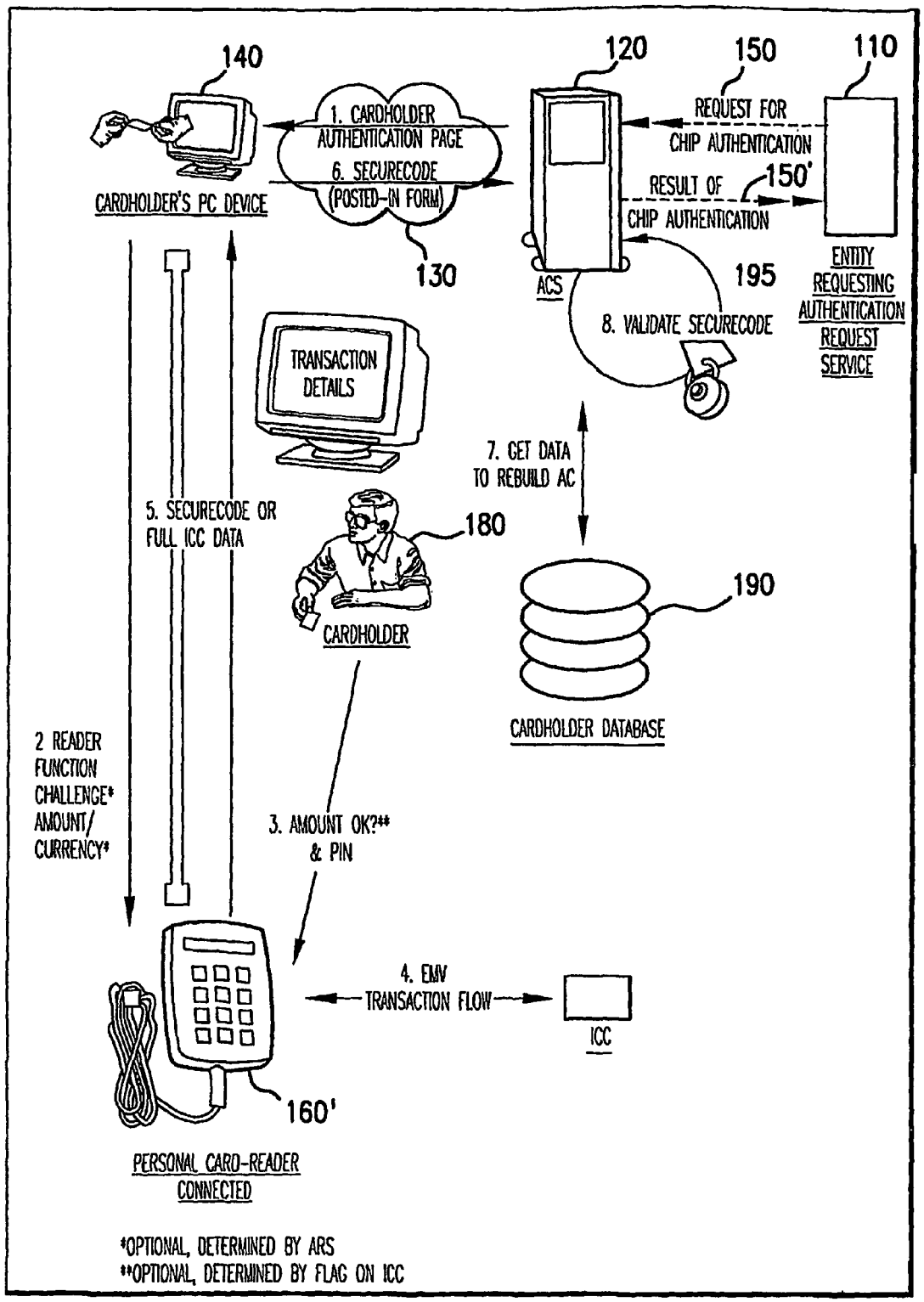

FIGS. 1 and 2 show schematic implementations of CAP of the present invention. In addition to the cardholder himself or herself, various system components or actors are involved a CAP implementation. The various system components, which may be physical or logical, include an Authentication Request Server, a Cardholder's PC Device, a secure code Authentication Application (SCAA), and connected or unconnected PCRs. These system components may be conventionally linked or configured using, for example, wired or wireless networks.

The Authentication Request Server is a logical entity, which may be configured to provide an authentication request service to another entity/component in a Web server environment, independent of that entity/component. Such an Authentication Request Server can readily adapt and evolve with different e-commerce environments and needs. Once the Authentication Request Server authenticates the cardholder, the Server can return a positive or negative authentication result to the requesting entity/component The cardholder's Personal Computing Device may be any computer platform or access device on which the cardholder performs the activity that requires them to be authenticated. The computer platform may be a PC platform, which may be connected to a PCR. Alternatively, the computer platform may be any device that is capable of accessing the Internet, including, for example, PDAs or other mobile Wi-Fi devices. The cardholder may be assigned a smart payment card (e.g., ICC) and a PCR. In the preferred implementations of CAP, a cardholder must enter a personal identification number (PIN) into his or her PCR before a secure code is generated and supplied to the Authentication Request Server for validation.

The PCR may be any suitable EMV-compliant card-reading device, which is designed to interact with the cardholder and the ICC to produce a secure code. Conventional cryptographic techniques (e.g., key techniques) may be used to produce the secure code. The PCR may have a display and keypad to enable limited cardholder interaction. A suitable PCR may, for example, be, a low cost handheld smart card reader with a numeric keypad and a display. The PCRs may be standalone, requiring no physical connection to the cardholder's personal computing device. In such instances, a cardholder must manually transfer all data between the PCR and the PC device.

The PCRs also can be devices that are physically connected to the cardholder's PC devices. In such instances, cardholders may need to only enter their PIN on the PCR in order to initiate the authentication process as the secure code is automatically passed by the PCR to the user interface on their connected computing device. A connected PCR may provide conventional security or protection of the PIN during the PIN-entry process. The display on the PCR may be capable of showing a PIN validation result and, for unconnected devices, displaying a "secure code" to be entered on the PC or PDA by the cardholder. A connected reader can behave as an unconnected reader if no connection is available. The PCRs used in CAP implementations may be of a generic design, which can support a variety of card implementations. The cardholder may be prompted by the Authentication Request Server (via the PC device display interface) whether or not to enter a challenge in the PCR. When such an indication is made, the PCR may be capable of allowing the cardholder to enter the challenge and then include the challenge in the computation of the secure code.

The secure code Authentication Application (SCAA) may reside on a multi-application credit, debit or other card (e.g., ICC) alongside a standard payment application. The SCAA may be a separate instance of the payment application, in which case the issuer has the option of using separate security environments for payments and remote authentications. The application may support both the generation of a "one-time passcode" and the creation of a "proof of transaction acceptance" code. Card issuers also may optionally choose to use the SCAA for other services. The SCAA may include formatting information or templates, which instruct a PCR on the type of secure code format expected by various card issuers. Thus a single PCR design may be used to support a wide range of card types.

In preferred implementations, the functions of one or more of the cardholder's Personal Computing Device, ICC and a PCR may be integrated in a single device of instrument, which can be used by the customer to access the Internet and perform authenticated transactions. A suitable integrated device may, for example, be a card with a display, which integrates the functions of an ICC and an unconnected PCR in a user-convenient package. Another suitable integrated device, which integrates the functions of an ICC and an unconnected PCR in a user-convenient package, may be a key fob. A PDA or other personal Internet access device also may be configured to perform the functions of the ICC and PCR assigned to a cardholder. FIG. 23 is a schematic representation of a card 230, a fob 240, and a PDA 250, all of which include circuits that can perform both PCR and ICC functions. PDA 250 can additionally function as an Internet access device.

FIG. 1 schematically shows an exemplary CAP authentication process 100 that may be used to authenticate a cardholder 180 for an on-line Internet transaction. Cardholder 180 may be issued a personal ICC 170 and an unconnected PCR 160 for conducting on-line transactions. It will be understood that ICC 170 and PCR 160 together may be an integrated card with a display (FIG. 23 card 230). Process 100 may be initiated in response to an authentication request 150 sent by an external Entity 110 to Authentication Request Server 120. In process 100, Authentication Request Server 120 interacts with cardholder 180 through the medium of a Card Authentication Page 130 (e.g., an HTML page) displayed on the cardholder's PC device 140. Authentication Request Server 120 generates HTML page 130 and may provide it directly. Alternatively, HTML page 130 may be provided via the authentication requestor (Entity 110) depending on the particular web server infrastructure or techniques that are deployed in the electronic network. The request for authentication (e.g., request 150) may be the result of an HTTP query, which is capable of processing HTML in the response (e.g., result 150') generated by the Authentication Request Server 120. In process 100, the request for the authentication (150) may be required to include or otherwise supply the following information or data:

Personal Account Number (PAN)—The PAN of the card to be used in the authentication process Cardholder's Personal Assurance Message (PAM)—Cardholders enrolled into the CAP programs may be required to supply an optional Personal Assurance Message that will be displayed when asked to authenticate.

Transaction Details—Details of the transaction for which authentication is being requested must be displayed to the cardholder, whether payment for goods from a website or to obtain access to a bank account.

With reference to the integer numbered steps in FIG. 1, at step 1 in process 100, Authentication Request or Control Server 120 generates a Cardholder Authentication Page 130 for display to the cardholder. Cardholder Authentication Page 130 may be an HTML page displayed on cardholder's PC device 140. Cardholder Authentication Page 130 may display details of the transaction supplied by the requesting Entity 110. A sixteen digit PAN may be displayed in groups three groups of X marks (i.e., "XXXX"), followed by the last four actual digits in the PAN to help cardholder 180 recognize or use the correct card for authentication. The cardholder's PAM, which is supplied when the cardholder enrolls in the CAP also may be displayed. Next at step 2, cardholder 180 may initiate a request for a security token, i.e., a secure code, for remote payment or identification. The cardholder may be prompted to have his or her ICC 170 read by PCR 160. The cardholder may be provided with a choice of requesting different types of secure codes (step 2a). The different types of secure codes may correspond, for example, to signature authentication for remote payment, or to identification authentication for bank account access. For the first type of secure code, (Bruce, Alfred, Pls. confirm) cardholder may optionally be prompted to enter a challenge displayed on web page 130 into PCR 160. If no challenge is provided, the cardholder may proceed by activating any suitably designated keystroke on PCR 160 (e.g., a Proceed button). Further, for transactions where ICC 170 has an Internet Authentication Flag (IAF), which indicates a transaction amount that must be signed or authenticated, a transaction amount may be displayed to cardholder 180 on web page 130. Cardholder 180 may be prompted to select the currency of the transaction from an in-built list and then to enter the amount displayed on the web page. After this entry the cardholder may proceed to next step 3 by activating the suitably designated keystroke on PCR 160.

At step 3, cardholder 180 may be prompted to enter a cardholder PIN. If the PIN is not entered correctly, the cardholder may be prompted to re-enter the PIN. Cardholder 180 may be allowed a limited number of attempts to enter the PIN correctly. This limited number may be a pre-selected number that is set in an internal retry counter in ICC 170. If cardholder 180 is unable to enter the correct PIN in the allowed number of tries, the transaction is rejected. Cardholder 180 then may optionally be requested to submit different or alternate means of payment.

After a correct PIN has been entered, at step 4 PCR 160 conducts an optimized EMV transaction dialogue with card 170 to generate an application cryptogram. The cryptogram may be an Authorization Request Cryptogram (ARQC) in EMV standard terminology. In some instances ICC 170 may have internal risk management routines that cause it to generate an Application Authentication Cryptogram (AAC) instead of an ARQC. Either type of cryptogram may be acceptable to PCR 160. At step Sa, PCR 160 converts the AQRC or AAC into a numerical secure code for display to cardholder 180. The numerical secure code may, for example, be 8 digits long. At step 5b, the secure code generated by PCR 160 is read and may be manually entered by cardholder 180 in to an appropriate entry field in HTML page 130 on Cardholder's PC device 140. At step 6, HTML page 130 with the secure code entry may be submitted by cardholder 180 to Authentication Request Server 120 for approval or validation. Next at step 7, Authentication Request Server 120 may access a cardholder database 190 to retrieve or update card-specific static and dynamic data. The card specific dynamic data, which may be tracked by the Authentication Request Server 120, may include an Application Transaction Counter (ATC). A copy of the last known ATC may be kept cardholder database 190 so that a full ATC can be correctly rebuilt in combination with partial ATC (lower bits) returned in the secure code.

At step 8, Authentication Request Server 120 may validate the secure code by rebuilding the input data used in the generation of the cryptogram by the ICC. The rebuilt input data may include known static data, any transaction specific data (challenge, amount/currency) that was submitted to ICC 170 by PCR 160 (step 4), and data retrieved from card database 190. In instances where no challenge is used at step 3, PCR 160 may be configured to use a default null value for the unpredictable number. Similarly if no amount and currency values are used at step 3, PCR 160 may be configured to use default values of 0 for both variables. From the rebuilt input data, the application cryptogram (AQRC or AAC) may be recomputed and compared with the partial application cryptogram (AC) in the secure code received at step 6 by application request server 120. If the recomputed and received AC match, an ATC value may be updated in card database 190.

A final step 195 in process 100, Application Request Sever 120 provides the results of the authentication test to requesting Entity 110.

FIG. 2 schematically shows another exemplary authentication process 200 that may be used in instances where cardholder 180 is issued a connected PCR 160'. Process 200 may be generally similar to process 100 except in that any challenge and amount/currency data is communicated directly or automatically to PCR 160' by an embedded software component in HTML page 130. Similarly, a secure code may be automatically entered in to a proper data field after cardholder 180 correctly enters his or her PIN (at step 3) for verification. Like process 100, process 200 may present a choice of signature or identification operation to cardholder 180 via PCR 160'. In instances where a transaction amount is required to be signed off by cardholder 170, process 200 may display the amount on PCR 160' before enabling PIN entry. Authentication Request Server 120 processes the secure codes generated by process 200 in a manner identical to the processing of secure codes generated by PCR 160 (FIG. 1).

In both processes 100 and 200, EMV security features are the basis for security of CAP. More specifically, CAP relies on the generation of a cryptogram, namely the Application Cryptogram (AC), by the ICC to establish proof of card and cardholder presence for generation a one-time secure code. The proof of transaction approval by the cardholder is based on the use of a challenge. The use of transaction specific cryptograms offers protection against the repeated submissions of a genuine transaction and the generation of fraudulent transactions.

The ICC (e.g. ICC 170) is programmed to generate a cryptogram for a particular transaction in response to a standard EMV command (e.g., GENERATE AC command). The response generated by ICC 170 to an GENERATE AC command may be include the following data elements: Cryptogram Information Data (CID), Application Transaction Counter (ATC), Cryptogram computed by the ICC (AC), and Issuer Application Data (IAD). These data elements contain data that is unique to the particular transaction and non-unique data, which can be obtained from other sources. Data that is unique to the transaction is transferred (in cryptogram form) from the PCR to an Interface Application (e.g., as a secure code via HTML Page 130) for further processing. Data, which is obtainable from other sources, need not be included in the secure code. Such non-unique data may be assumed to have particular values for an issuer's given card scheme, unique to the particular ICC and known (or at least deducible) by the issuer host, via its cardholder database.

ICC 170 may include a data object or mask (e.g., an Issuer Internet Proprietary Bitmap (IIPB) with a tag of '0x9F56') that is used by the PCR to determine which portions (i.e. bits) of the ICC's response must be used for generating authentication data or cryptograms. The number of bits that are used may be defined or selected by the issuer. The number of bits may be selected, for example, on ergonomic considerations of the limited number data bits that can be conveniently transferred manually by a cardholder from an unconnected PCR 160 to PC device 140. The IIPB may be used as a bit-mask by PCR 160 or 160' to derive an "IIPB Data Token," which when compressed forms the secure code token passed to the authentication requester.

Figure 9:
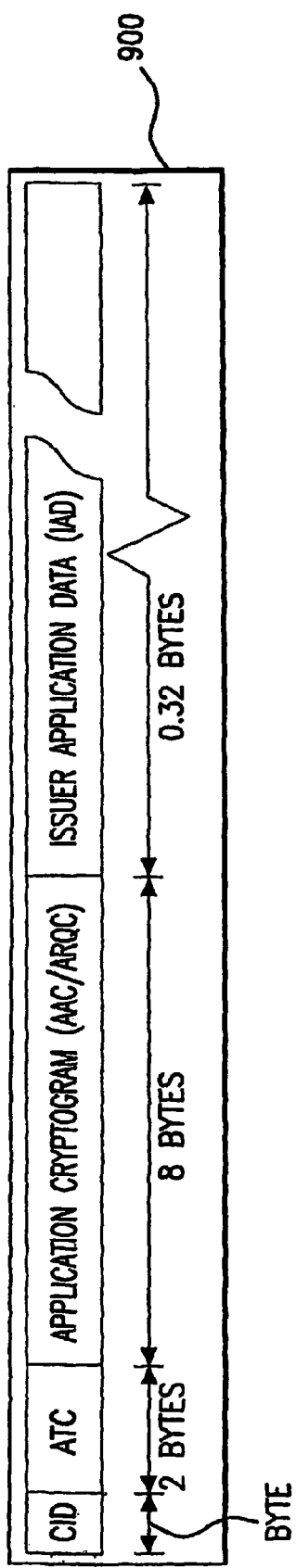
FIG. 9 is an illustration of an exemplary IIPB Data Structure, in accordance with the principles of the present invention.

FIG. 9 shows an exemplary IPPB structure 900. The bits that make up IIPB 900 may be considered as transmit flags, indicating which bits from the Generate AC response are required by the issuer for inclusion in the secure code. These flags may correspond on a bit-for-bit basis to the bits that must be sent from the PCR (e.g., CID 1 byte, ATC 2 bytes, AC 8 bytes, and IAD 0-32 bytes). IIPB 900 may be up to about 11 bytes long in the unlikely case that no LAD is defined. IIPB 900 may be up to 43 bytes long in cases where an issuer's application technology uses the full 32 bytes available to the Issuer Application Data (IAD). Thus, IIPB 900, which is used as a mask against the concatenation of the data elements CID, ATC, AC and LAD, can result in a structure having a length between 11 and 43 bytes. PCR 160 and 160' may both be suitably configured to determine that the length of IIPB 900 matches the length of the data items returned in ICC 170's Generate AC response.

An effective IIPB Length refers to the number of bits—as defined by the IIPB —to be transferred within an IIPB Data Token (which is governed by the number of bits in the IIPB that are set to 1 to indicate required bit transfer). In exemplary CAP implementations, the secure code does not exceed 26 bits, which is the maximum number of bits that can be transferred with an 8-digit decimal number (i.e. 67,108,863). The effective IIPB length therefore cannot exceed 26 bits, as this would require more than 8 digits for the token.

ICC 170 establishes proof of cardholder presence by the use of offline PIN validation. EMV standard specifications require that offline PIN validation be performed before the generation of an AC. Consequently, cardholder presence is required to generate a valid AC, and the existence of a valid cryptogram is sufficient to demonstrate cardholder presence. The AC is usually based on the ARQC, but may be based on the AAC should the card's internal risk management routines determine to decline a payment transaction.

The proof of the acceptance or approval of a transaction by the cardholder is based on the use of data provided by the Authentication Request Server to generate the cryptogram and secure code. The data provided by the Authentication Request Server is used as a transaction-specific challenge displayed to the cardholder. The challenge is a numeric value that is developed from information known only to the Authentication Request Server. The numeric value may be based on any suitable data that the issuer may consider to relevant or pertinent (e.g. the transaction amount and currency code). A different challenge will produce a different secure code and there is no predictable way to know what challenge could be used to create a specific secure code. Accordingly, the use of a transaction-specific challenge provides the issuer and Authentication Request Server with the proof that the cardholder did approve that specific transaction because the displayed challenge is included in the cryptogram generate by the PCR and the cryptogram is included in the secure code In order to ensure protection against fraudulent replays or resubmissions of genuine transactions, implementations of CAP may be configured to check the Application Transaction Counter (ATC) received from the ICC against the last received ATC for that particular ICC. Transactions using a previously received ATC may be declined as a replay. Further, the AC generated by the ICC may be calculated so that it varies as a function of the ATC. This may be accomplished by including the ATC as part of the input data used for AC calculation.

Only truncated portions of the AC generated by the ICC are transferred to the issuer. Each cryptogram is truncated, as specified by the Issuer Internet Proprietary Bitmap (IIPB). The issuer may, for example, define the IIPB, in such a way that 16 bits from the AC are included in the secure code returned by the PCRs. Because of the reduced size of truncated cryptograms, issuers may implement fraud detection systems to detect abnormal numbers of failed cryptogram validations.

Figure 3:
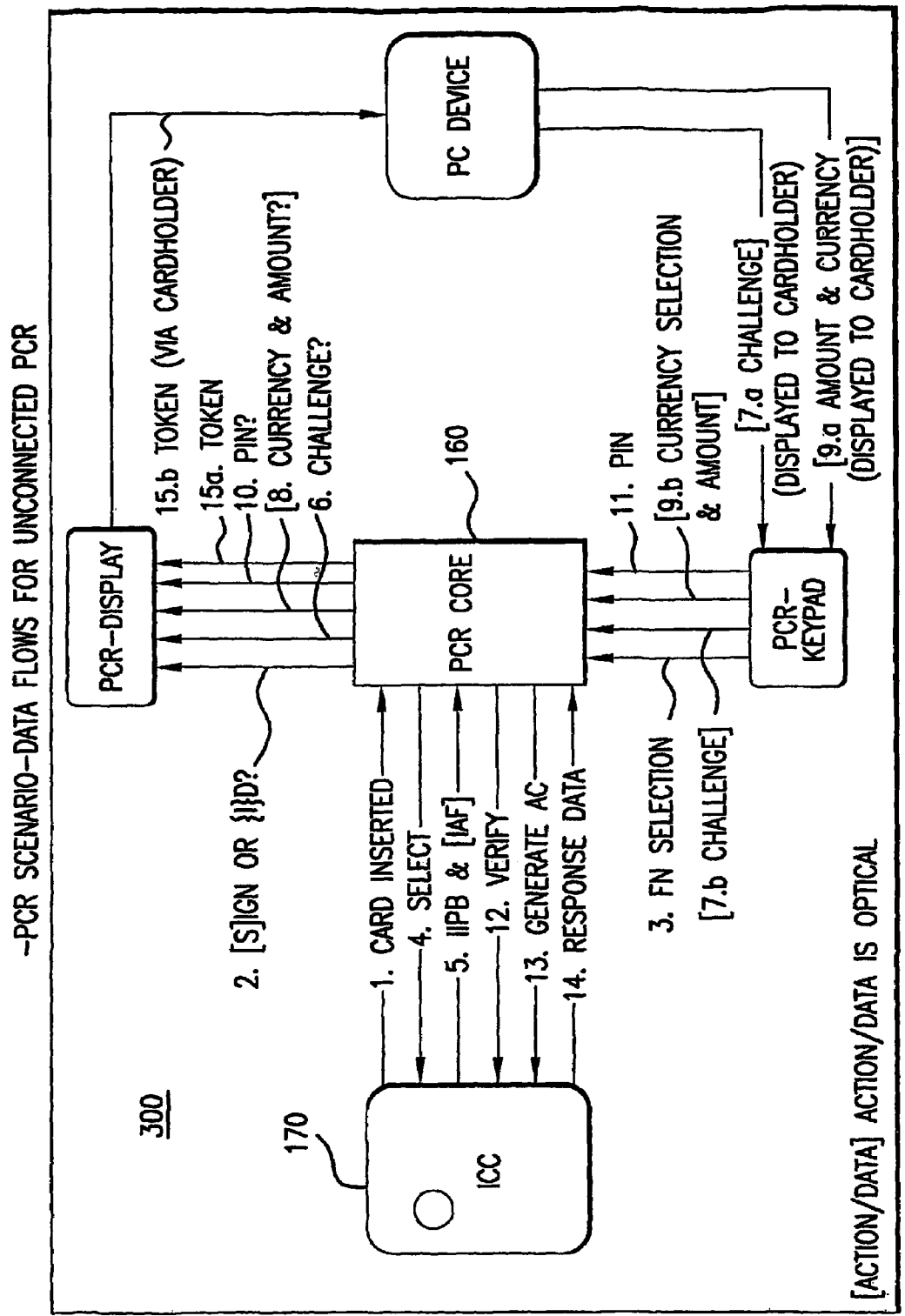
FIGS. 3 and 4 are schematic illustrations of Personal Card Reader processes and data flows that are involved in generating a challenge number and in PIN verification for an unconnected and a connected PCR, respectively, in accordance with the principles of the present invention.
Figure 4:
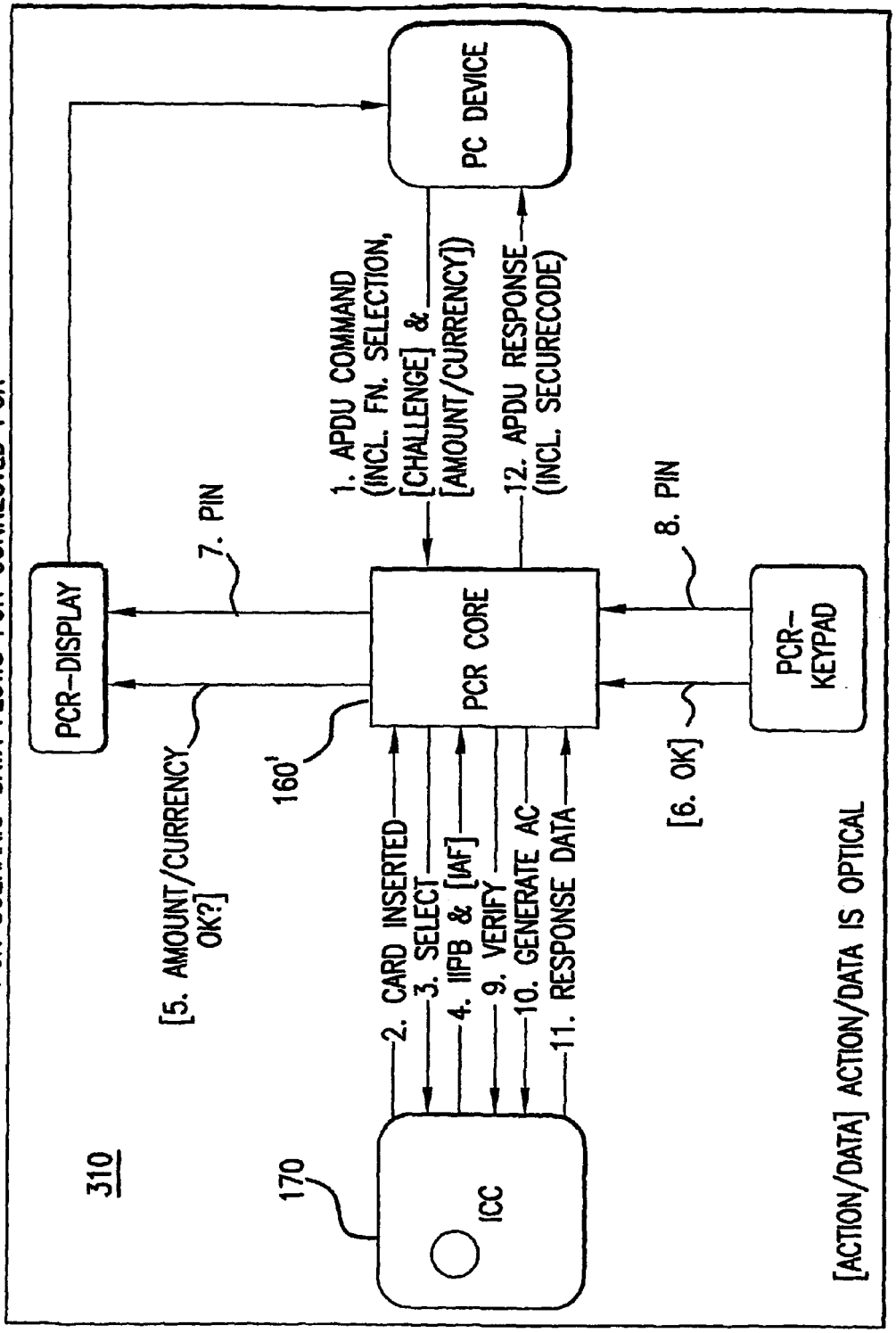

FIGS. 3 and 4 show exemplary PCR processes and data flows that are involved in generating a challenge number and in PIN verification for an unconnected and a connected PCR, respectively. A primary difference in the use of a connected PCR and an unconnected PCR is user convenience. In the case of a connected PCR, the link between the PC device and the PCR carries data between the two. In the case of an unconnected PCR, data must be manually copied by the cardholder for transfer between the two. It will be understood that FIGS. 3 and 4 are not detailed illustrations of the exact commands sent to the ICC or the exact processing steps at the PCR. For clarity, only those elements, which help illustrate the system, its data structures and general processing principles, are shown schematically.

With reference to integer numbered steps shown in FIG. 3, a sequence of process steps for PIN verification and corresponding prompts that are displayed to the cardholder may be as follows:

1. The cardholder is requested to insert their card. The cardholder inserts their issuer authentication enabled card (ICC) into the personal card reader.

Insert Card

With unconnected readers, the action of inserting the card may turn the PCR's power on, or the cardholder may need to press a button to turn the power on.

2. The cardholder is requested to select the type of PCR functionality required.

[S]ign or [I]d

3. The cardholder makes his or her selection of PCR functionality via specific function keys or a menu system.

4. The PCR uses the selection list appropriate to the functionality requested to search for and select an application to use in generating the appropriate secure code.

5. The PCR reads selected data elements from the ICC, including IIPB and IAF.

If the cardholder has selected a Signature operation:

6. The PCR prompts the cardholder to enter a Challenge.

The generation of the Challenge is proprietary to the issuer; the Challenge will be used for the Unpredictable Number (UN) in the EMV Transaction handling.

Challenge>

7. The cardholder must enter this Challenge on the keypad of the PCR and press the [Proceed] key to indicate completion of Challenge entry.

5
    58
    581
    5811
    58113
    581139
    5811396
    58113967 [Proceed]

Where Authentication Request Servers do not require a Challenge, the cardholder may simply press the [Proceed] button without entering any Challenge digits. The PCR will use a null value (0), for the UN in response to a later GENERATE AC command.

8. If the ICC indicates that an amount & currency are to be included in the cryptogram, the PCR displays a standard list of currencies for the cardholder to select from:

| | | |
|---|---|---|
| 1. | EUR | |
| 2. | USD | |
| 3. | GBP | |
| 4. | Other | |
| >1 | [Proceed] | |

9. The cardholder is then prompted to enter the amount.

>????????.?? EUR

The cardholder enters the amount and presses [Proceed]. Issuers that require an amount and currency to be included in the cryptogram may indicate this requirement in the setting of the IAF. The amount and currency is displayed to the cardholder on the Cardholder Authentication Page.

10. The PCR displays a prompt for the cardholder to enter their PIN:

enter PIN

11. The cardholder enters their PIN digits, and presses the [Proceed] key to indicate completion of PIN entry, as illustrated with the 4-digit PIN example below:

*
    **
    ***
    ****[Proceed]

12. The PCR submits the PIN to the ICC for verification.

Error Check: If the ICC reports an invalid PIN entry, the PCR informs the cardholder of the number of PIN attempts remaining:

Bad PIN, 2 left

The cardholder then enters the correct PIN, presses the [Proceed] key, and the PCR reports a valid PIN entry.

*****[Proceed]

PIN OK!

The PIN verification process 310 using a connected reader (FIG. 4) may be generally similar to the PIN verification process 300 using an unconnected reader (FIG. 3). However, in process 310, a receipt of the appropriate APDU command may start the transaction process flow rather than the insertion of a card or the powering on of the reader as in process 300. Process 310 also may differ from process 300 in the manner of receiving any challenge data. The cardholder is not required to enter a challenge, as any necessary challenge data can be supplied with the APDU that initiated the transaction.

In both processes 300 and 310, the PCRs may calculate secure codes in identical manner. In process 310, the calculated secure code may be required to be returned in the APDU response. This requirement ensures that the Authentication Request Server can treat connected and unconnected PCRs in the same manner when processing the response.

Figure 5:
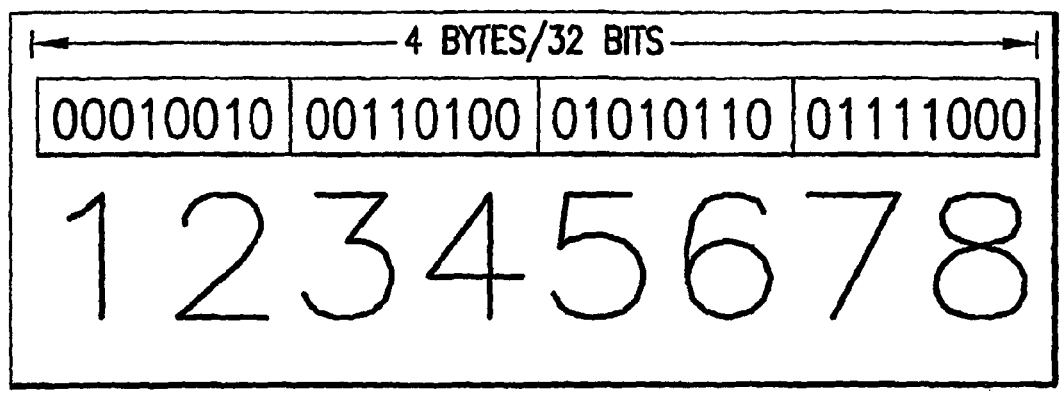
FIG. 5 is an illustration of an exemplary 8 digit Challenge in accordance with the principles of the present invention.

CAP uses an Application Cryptogram (AC) as the mechanism for authenticating the ICC and the cardholder. The EMV command GENERATE AC is used to request the ICC to generate an Application Request Cryptogram (ARQC). The data that must be supplied in this command is specified by the EMV data element conventionally identified as CDOL1. An Unpredictable Number (UN) is a 4-byte (32-bit) component of the data passed to the ICC in the GENERATE AC command. It is a number (or data) that is unpredictable to the ICC as opposed to the application. The challenge passed to the PCR is used as the Unpredictable Number (UN) for cryptogram generation. The maximum number of 8 digits may be used for the Challenge in a BCD (Binary Coded Decimal) form when sent to the ICC. Any challenge of less than 8 digits may involve use of conventional padding (e.g., by leading zero) up to 8 digits when creating the UN. FIG. 5 shows an exemplary 8-digit Challenge.

In CAP implementations, the PCR is configured to process the response from the ICC to the GENERATE AC command in order to arrive at the secure code or token that must be returned to the Interface Application. The full response of a PCR to the GENERATE AC command may be too large to be sent to the issuer. Accordingly, the PCR uses the IIPB to perform a data extraction and compression process to generate an IIPB Data Token, which is the data that is transferred (after encryption) from the PCR to the Interface Application. Connected PCRs can transfer this data directly to the Interface Application, whereas for unconnected readers, the cardholder must transfer this data manually.

A bit setting of '1' in the IIPB (See e.g., FIG. 9) indicates the corresponding bit position in the response data is 'required' and needs to be sent.

A bit setting of '0' indicates that the issuer either knows, or is able to otherwise derive, what the bit setting should be and thus the bit does not need to be sent as part of the secure code.

Figure 7:
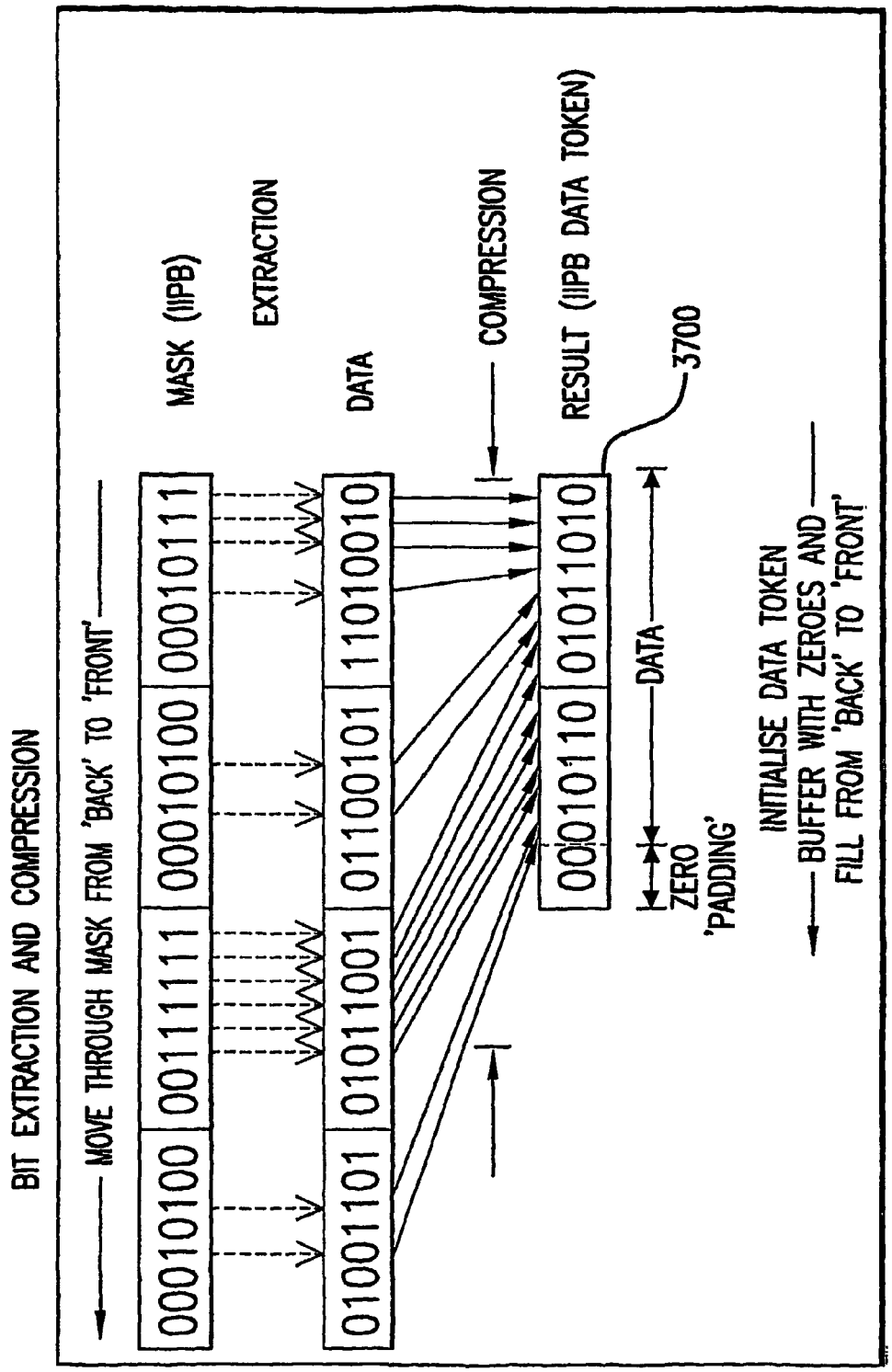
FIG. 7 illustrates an exemplary compression technique for treating a cryptogram bit pattern as a binary number and performing a mathematical conversion from Base-2 to Base-10, in accordance with the principles of the present invention.

The IIPB Data Token is built up, from right to left, with the first bit to be extracted placed into bit 1 of the last byte of output data, the second in bit 2, etc. An exemplary IIPB Data Token 3700, which is filled in this manner until there are no more bits to transfer, as shown in FIG. 7.

The data (i.e., exemplary IIPB Data Token) that is transferred from the PCR to the Interface Application is first encrypted as a secure code. In the CAP implementations, the PCRs are configured with suitable algorithms to compute a number that represents the bit pattern of the data to be transferred. An unconnected reader will then display this number—the secure code—so that the cardholder can enter it into the appropriate field displayed by the Cardholder Authentication Page.

Figure 6:
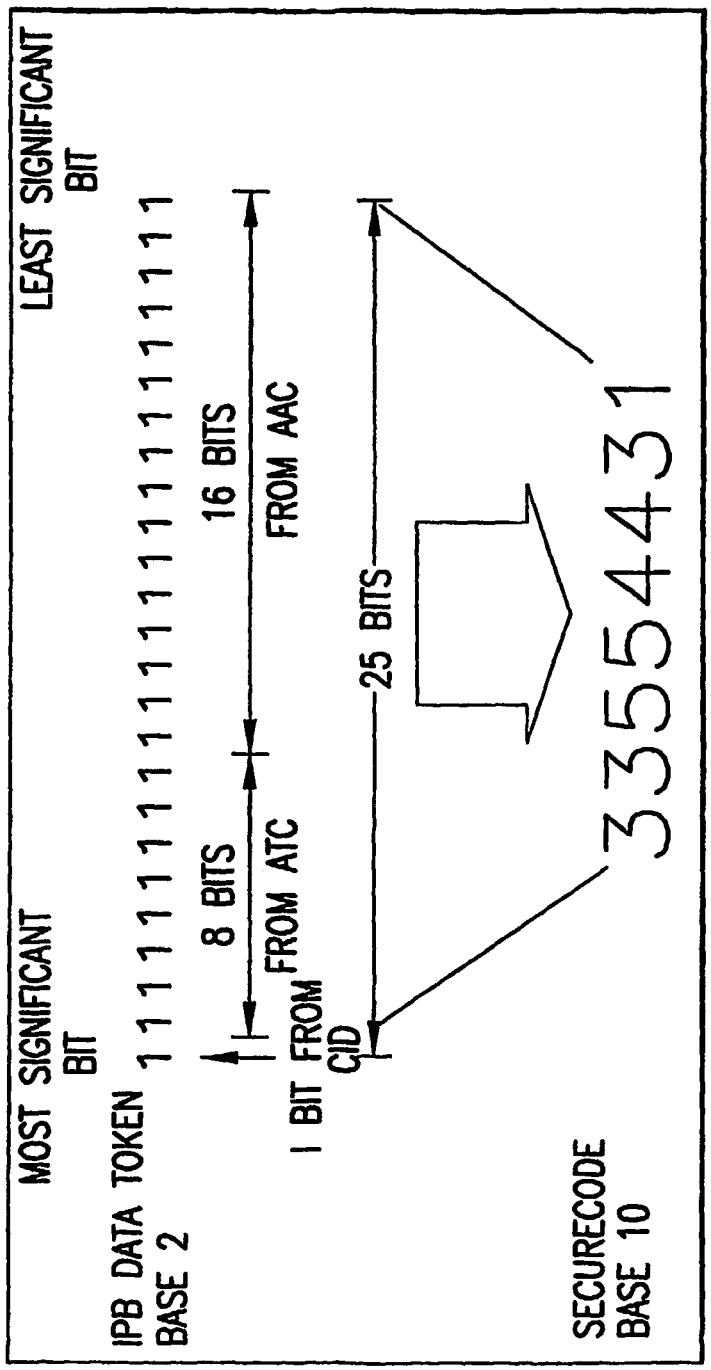
FIG. 6 is an illustration of exemplary IIPB Data Token in accordance with the principles of the present invention.

The PCR encryption algorithms used for converting the required bits into displayed numeric digits are preferably interoperable and reversible on the Authentication Request Server. The same algorithm that is used to convert from bits to token may be reversed to convert from token to bits. A suitable 'compression' technique involves treating the bit pattern as a binary number and performing a mathematical conversion from Base-2 to Base-10, as shown in FIG. 6.

Implementations of CAP are designed to be consistent or compatible 3-D Secure platforms, systems, and methods of all parties in a transaction chain, including the merchant, the acquirer, the issuer, and the cardholder. CAP advantageously standardizes the use of issuer-defined chip authentication data. CAP implementations may advantageously exploit the standard message infrastructure for both new and existing 3-D Secure platforms, systems and methods to support a wide range of cardholder authentication schemes and transaction channels.

Figure 8:
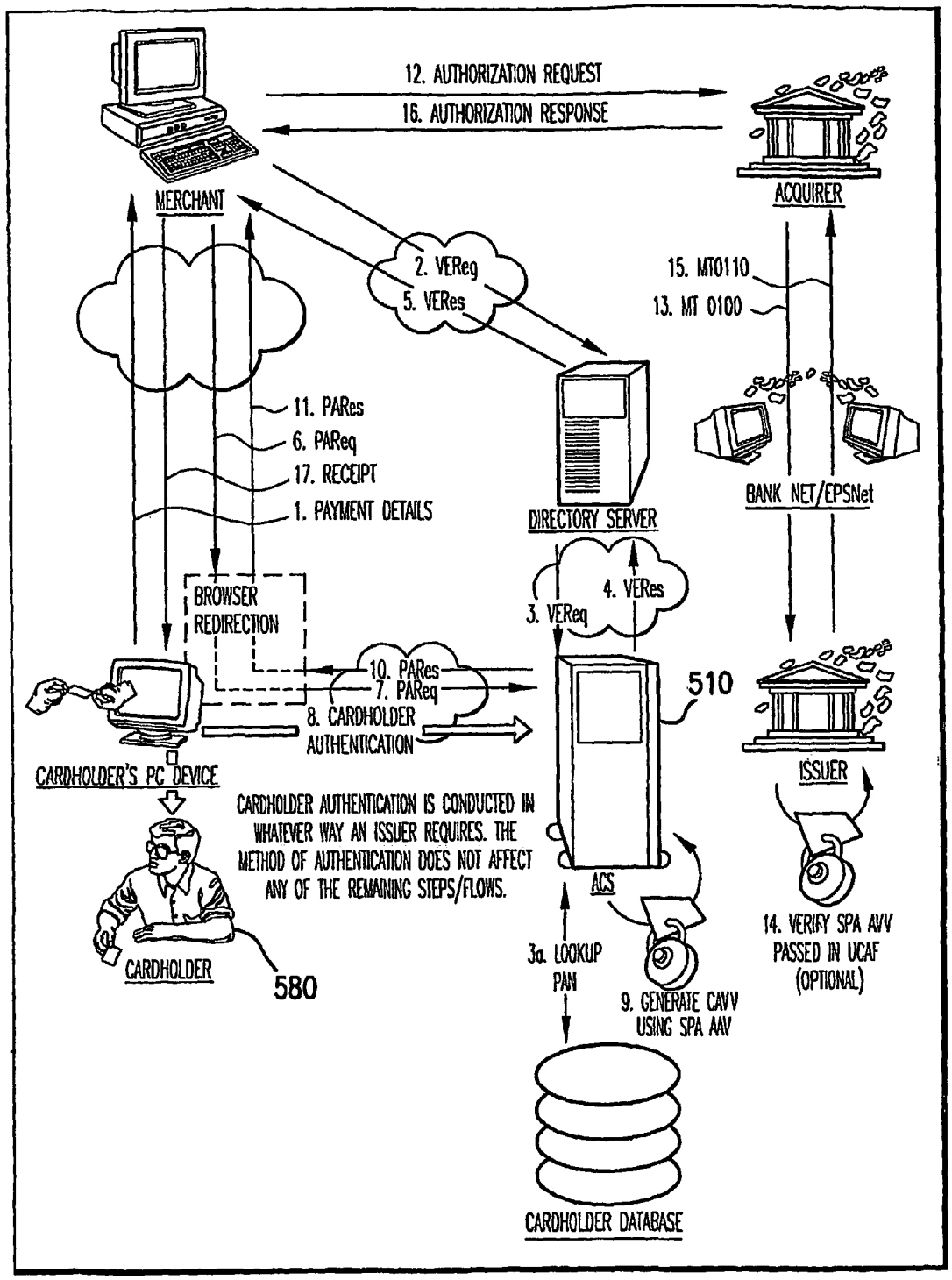
FIG. 8 illustrates (in conjunction with FIGS. 1 and 2) the steps or message flows between the entities involved in an exemplary CAP (chip-authenticated) transaction in an 3-D Secure™ environment, in accordance with the principles of the present invention.

The following logical or physical 3-D Secure Entities may be involved over the lifetime of a CAP chip-authenticated transaction (FIG. 8).

Cardholder—The cardholder initiates the transaction and is responsible for entering data into the merchant's payment web pages, the Personal Card Reader, and the Cardholder Authentication Page. The cardholder must enter their PIN into the PCR in order for the PCR to create a secure code using a Secure code Authentication Application (SCAA).

Merchant—The merchant supplies the necessary data to start the authentication transaction, and receives the resulting authentication data to forward, via their acquirer, to the issuer for verification. The merchant operates the normal 3-D Secure process.

Cardholder Authentication Page—The Cardholder Authentication Page is the web page presence of the ACS. This page displays the relevant data and instructions supplied by the ACS, and interacts with the cardholder. The Cardholder Authentication Page is returned to the cardholder by the ACS and runs as part of the Internet browser (i.e. as a 'pop-up' window). This page, in addition to the standard display information for MasterCard's implementation of 3-D Secure, may also include a Challenge if required by the issuer.

Personal Card Reader—The Personal Card Reader interacts with the cardholder and the ICC to produce a Secure Code that is passed, indirectly, to the issuer through the ACS. Depending on the type of reader and type of transaction, the cardholder may need to enter a Challenge and possibly amount/currency displayed on the issuer generated authentication pop-up window before entering the required PIN. The cardholder must enter the Secure Code (displayed on an unconnected PCR) onto the Cardholder Authentication Page web page. (Data entry, other than PIN entry and possible amount/currency confirmation, is not necessary with a connected reader).

ICC—The EMV-compliant smart card authenticates the cardholder by means of PIN verification, and generates a suitable cryptogram based on data supplied by the Personal Card Reader.

Acquirer—The acquirer accepts the transaction data from a merchant and forwards it to the issuer via the appropriate network. The acquirer may follow standard or mutually agreed upon processes to obtain authorization from the issuer.

Issuer—The issuer distributes Personal Card Readers to those cardholders that are signed up for the MasterCard Chip Authentication Program for 3D Secure. Importantly, the issuer may optionally validate the authentication data (AAV) transmitted in the DCAF field—within the authorization request from the acquirer—according to the rules of that issuer.

Access Control Server—The issuer operates the Access Control Server as specified for 3-D Secure with the additional ability to present the Cardholder Authentication Page and receive the secure code from the PCR (either directly, or indirectly from the cardholder). The ACS verifies the validity of the secure code by using an Authentication Request Service which:

Extracts the data known only to the chip (ATC and indicator for the type of cryptogram) from the secure code.

Regenerates the cryptogram.

Compares the result with the partial cryptogram in the secure code.

Enrollment Server—The enrollment server and enrollment process are the same as the normal 3-D Secure process. There may be a requirement for the cardholder to indicate that the PAN refers to a smart card and that the chip will be used to create a secure code in place of static password. This could be a cardholder decision or an issuer decision, or perhaps a configuration option. The issuer must indicate the format of the secure code and whether or not a Challenge is displayed for cardholder entry in the PCR. Ideally, the majority of these decisions will be configuration options from which the issuer can choose.

Directory Server—The Directory Server operates in the normal 3-D Secure mode.

FIG. 8 shows some of the steps and message flows 500 between the entities involved in an exemplary CAP (chip-authenticated) transaction in an 3-D Secure™ environment, which, for example, may be a 3-D Secure version 1.0.2 environment. CAP provides the authentication mechanism between the Card/Cardholder and the issuer's Access Control Server (ACS) 510. The exemplary message flows shown assume that prior to conducting the transaction, cardholder 580 has registered with an issuer for the service, and has a smart card and a compatible PCR. Further, cardholder 580, who wishes to make a purchase, has selected the required goods or services and has initiated a "checkout" process on the merchant's web site. The merchant has already requested cardholder 580 provide details of his or her payment card, which have been entered by cardholder 580 onto the merchant's web site in a protected manner. The CAP based authentication affects only step 8—creation and entry of the secure code.

Standard 3-D Secure version 1.0.2 message formats and data formats maybe used for all of message flows 500. Specifically, CAVV, which ACS 510 creates and returns back to the merchant for ultimate inclusion in the UCAF, carried is 28 characters long and contains the 20-byte field defined for 3-D Secure in base 64 encoding (See e.g., FIG. 10). The use of the CAP Authentication Application (SCAA) may be indicated in the "Authentication Mode" field (value '2'). The same format for AAV may used in dynamic secure code CAP operation and for the traditional 3-D Secure static password modes of operation.

With reference to FIG. 8, the integer numbered steps or messages flows 500 are as follows:

1. Payment Details: Cardholder to Merchant (HTTPS/POSTed Form)

The cardholder, having browsed and selected items, 'checks out' supplying personal details, including—of particular interest in this scope—payment card details to the merchant, i.e. the embossed card number (PAN).

2. VEReq (Verify Enrollment Request): Merchant to Directory Server (DS) (HTTPS/POST)

The merchant's 3-D Secure processing software sends a VEReq to the appropriate brand directory server to determine if the PAN is enrolled in the issuer's 3-D Secure program.

Merchants may be encouraged to maintain, on a daily basis, a local cache of the directory server in order to avoid consulting the directory server for every payment. The cache may contain all eligible brand card ranges participating in the program. Use of the cache option will prevent calls to the directory for those instances when the cardholder PAN is not eligible to participate in the program.

3. VEReq: Directory Server to Access Control Server (ACS) HTTPS/POST).

Based on card ranges, the directory server passes the VEReq onto the appropriate ACS. The ACS determines whether or not the card (cardholder PAN) is enrolled in 3-D Secure.

4. VERes (Verify Enrollment Response): ACS to DS (Response to HTTPS/POST)

The ACS returns an indication of whether the specific PAN is enrolled in the system, and, if so, the URL that will be used to redirect the cardholder's browser in order to perform authentication towards the ACS.

The ACS returns a unique Account Identifier, which must not be the PAN, that is used by the ACS when contacted by the cardholder with a PAReq to identify the payment card in question. This Account Identifier must match the PAN of the actual card used on a one-to-one basis in order that the key may be correctly generated so that the secure code can be verified.

5. VERes: DS to Merchant (Response to HTTPS/POST)

The DS returns that response to the merchant.

6. PAReq (Payer Authentication Request): Merchant to Cardholder (HTML Page)

The merchant's 3-D secure processing software constructs a PAReq and Base64 encodes it and places it into a HTML form field (PaReq). The merchant URL to which the cardholder's browser must be redirected after authentication is placed into a HTML form field (TermUrl) and any merchant state data that they might require when contacted via TermUrl is also placed into a HTML form field (MD). A HTML page is then returned to the cardholder as the response to the posting of their payment details. The POST address for this form is the URL of the ACS, as per the VERes.

7. PAReq: Cardholder to ACS (HIT/POST)

The page returned by the merchant typically may open up an additional small 'pop-up' window, which then POSTs the form data filled in by the merchant to the ACS.

The ACS looks up the cardholder details and determines the authentication mechanism to use for this particular payment card and, in the case of chip authentication the type of Challenge required for the authentication.

8. Cardholder Authentication: ACS to Cardholder to ACS (HTML Page followed by HTTPS/POST)

Step 8 may be conducted in a manner appropriate to the particular issuer and/or cardholder. In CAP implementations, the authentication process may be carried out using an Authentication Request Server as described with reference to FIGS. 1, 2 and in Appendix A. ACS 510 may support more than one type of cardholder authentication, but only one method per card may be allowed. ACS 510 may determine the allowed method for a card from the information stored for the card/cardholder. The ACS controls the interface with the cardholder and directs the cardholder's use of the PCR. Based on the configuration parameters within the ACS, the issuer may implement a "one-time passcode" secure code or may implement a "transaction acceptance" secure code. The difference is that the cardholder must enter a Challenge on an unconnected PCR before entering their PIN in order to accept a specific transaction. This step is not required with the onetime passcode.

9. Generate CAVY: ACS

On successful validation via the employed authentication mechanism, the ACS constructs a Secure Payment Application (SPA) AAV conforming to the implemented 3D Secure architecture. This value will be placed in the CAVV subfield of the PARes for return to the merchant.

10. PARes (Payer Authentication Response): ACS to Cardholder (HTML Page)

The ACS constructs a PARes, including the AAV and a message signature, and Base64 encodes it and places it into a HTML form field (PaRes). The merchant data received in the PAReq is also returned to the merchant in a HTML form field (MD). The POST address for the form in this page is the URL of the merchant, as per the PAReq's TermUrl field.

11. PARes: Cardholder to Merchant (HTTPS/POST)

The page returned by the ACS then POSTs the form data filled in by the ACS to the merchant, where the merchant's 3-D secure processing software may verify the message signature generated by the ACS.

12. Authorization Request: Merchant to Acquirer (Proprietary Communication)

The Merchant includes the AAV received in the PARes in the authorization request sent to their Acquirer, along with the standard authorization request data.

13. MT0100/0200: Acquirer to Issuer (BankNet)

The acquirer extracts the authentication data and inserts it into the UCAF field within authorization message and sends to the appropriate MasterCard authorization network.

14. Verify SPA AAV: Issuer

The issuer may verify the AAV value contained in the UCAF field of the authorization message to ensure that cardholder authentication took place with the given card.

15. MT0110/0210: IssuertoAcquirer(BankNet)

The standard authorization processing is performed and the response returned to the Acquirer.

16. Authorization Response: Acquirer to Merchant (Proprietary)

The merchant receives the authorization response from their acquirer.

17. Response/Receipt: Merchant to Cardholder (HTML)

The merchant returns an indication to the cardholder as to whether their payment has been accepted.

Figure 11:
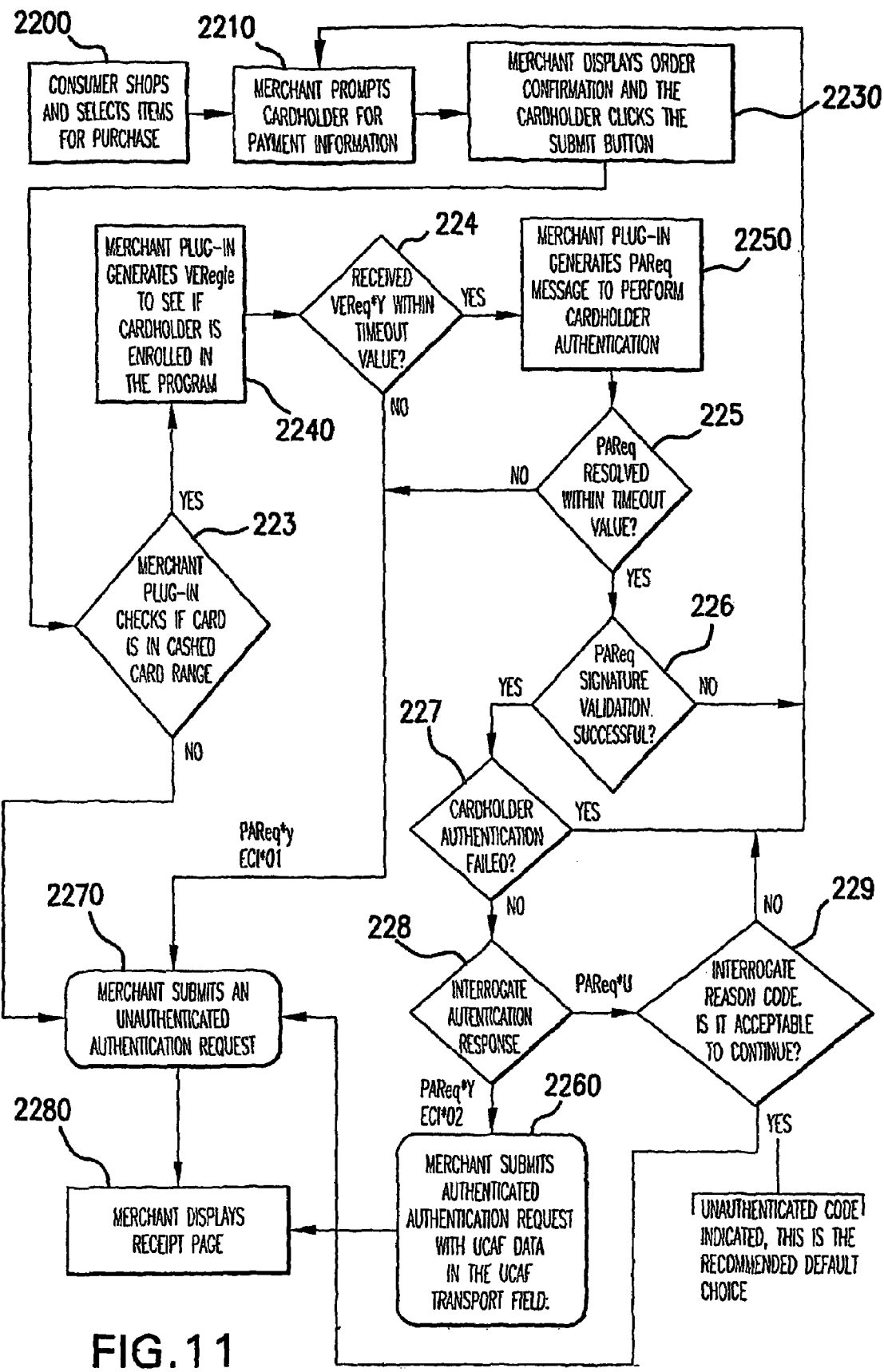
FIG. 11 illustrates (in conjunction with FIGS. 1 and 2) the process steps involved in a customer's on line purchase in an e-commerce environment in which merchants may optionally request cardholder authentication for the transaction in accordance with the with the principles of the present invention
Figure 12:
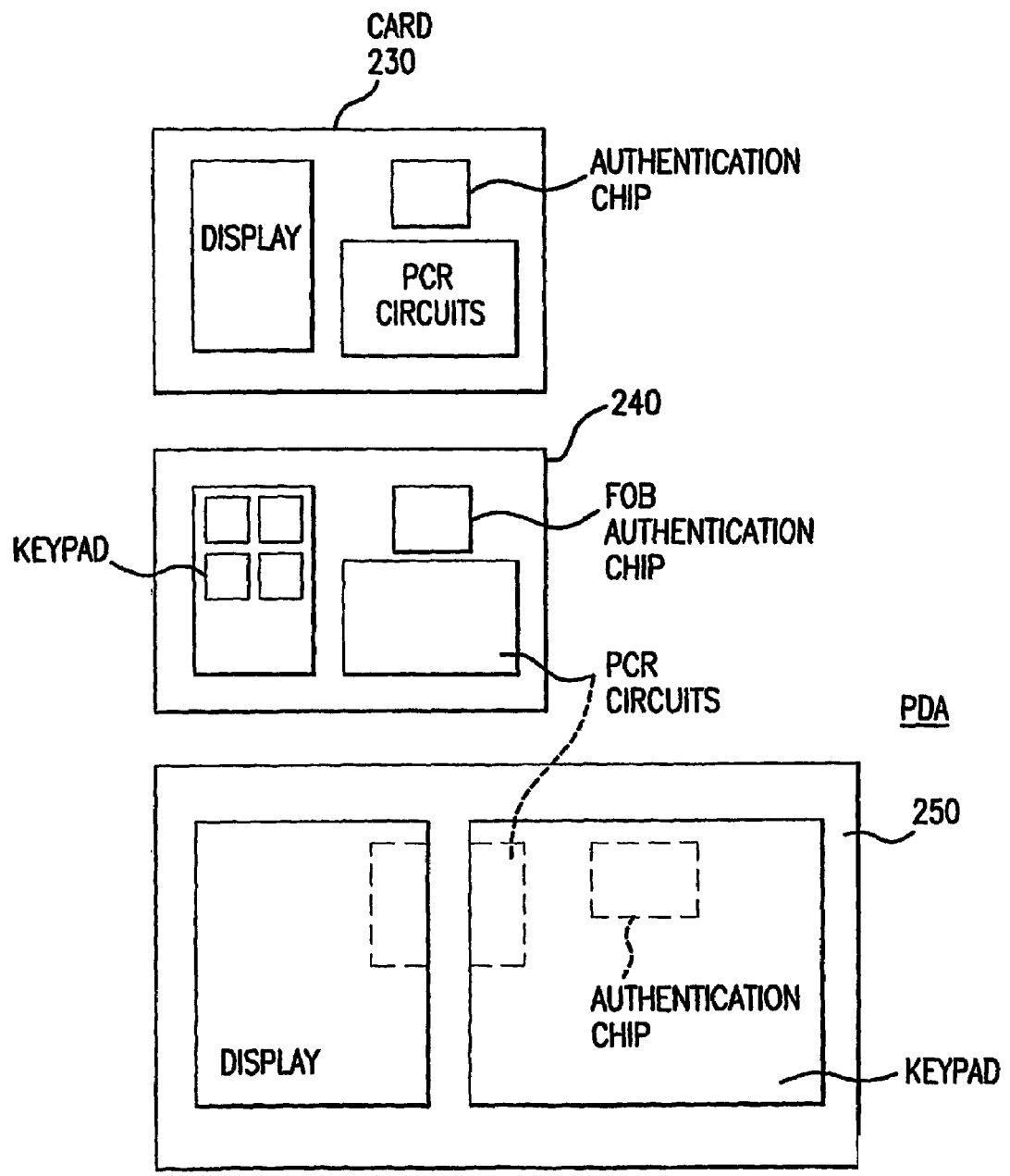
FIG. 12 is a schematic illustration of exemplary integrated devices in which the functions of an ICC, PCR and/or PC devices are integrated in one convenient physical package, in accordance with the principles of the present invention.

FIG. 11 shows an exemplary sequence of process steps that may be involved in a customer's on-line purchase in a 3-D secure environment with a CAP implementation. The CAP implementation may be designed to be layered on existing e-commerce systems so that transactions can be conducted with or without cardholder authentication services requested by merchants and/or enrolled cardholders.

At step 2200, the customer shops and selects items for purchase, for example, on a merchant web page. The customer may, for example, use integrated PDA 250 (FIG. 23) for this purpose. At step 2210, the merchant may prompt the customer for payment information in response to which the customer may enter a card: number. At step 2230, the merchant may display a confirmation request and require the customer to click a submit button. At step 223, the MPI may check if the card number is in a cached card range. If at step 223 the card number is not in the cached card range the MPI may at (step 2270) submit an unauthenticated authorization request. If at step 223 the card number is in the cached card range, the MPI may generate a VEreq to see if the cardholder is enrolled in the CAP program (at step 2240) and then wait for verification. At step 224, if a positive verification result is not received within a predetermined wait time, the MPI may proceed to step 2270 to submit an unauthenticated authorization request. Further at step 224, if a positive verification result is received within the predetermined wait time, the MPI may proceed to step 2250 to generate a message to the issuer to requesting cardholder authentication.

At step 225, if a positive response to the request is not received within a timeout period, the MPI may proceed to step 2270 to submit an unauthenticated authorization request. Further if at step 225, if a positive response to the request is received within a timeout period, the process may successively progress to steps 226 and 227 respectively for confirming whether a signature validation was obtained and whether the cardholder authentication process was successfully completed (by the ACS). If either of these steps is unsuccessful, the MPI may revert to step 2210 where the merchant may re prompt the cardholder for payment information. If both these steps indicate successful cardholder authentication process completion, at step 228 the MPI receives the authentication result, which may be positive or negative and have various reason codes.

Further at step 228, the MPI may interrogate the authentication result and proceed accordingly to submit an authenticated authorization request with UCAF data in the UCAF transport field (step 2260) or to step 2270 to submit an unauthenticated authorization request. At the step 228, the MPI may also alternatively proceed to step 229 to interrogate the reason codes in the received authentication result. According to results of the interrogation of the reasons, the MPI may optionally elect to re prompt customer for payment information (step 2210) or proceed to step 2270 to submit an unauthenticated authorization request. The MPI may after respectively submitting unauthenticated and authenticated authorization requests at steps 2270 or step 2260, may proceed to display a receipt page to the customer (step 2280).

Although the present invention has been described in connection with specific exemplary embodiments, it should be understood that various changes, substitutions, and alterations apparent to those skilled in the art could be made to the disclosed embodiments without departing from the spirit and scope of the invention.

We claim:

1. A system for authenticating a customer transaction on an electronic network, the system comprising:
    an access device for customer access to the electronic network;
    an integrated circuit card that is issued to the customer and contains customer-identifying data, a cryptogram application, and a bitmap that is proprietary to an issuer of the integrated circuit card;
    a reader that is provided to the customer and linkable to the access device; and
    an authentication request server (ARS) that in conjunction with an Access Control Server (ACS) is linked to the electronic network and can communicate with a party requesting authentication of the transaction, both the ARS and the ACS being remote from the access device, the ARS separately having the customer identification data and the bitmap,
    wherein the ACS is configured to receive transaction information from the requesting party over the electronic network and to communicate transaction data directly to the the customer's access device over the electronic network,
    wherein the customer's access device is configured to communicate the transaction data to the reader,
    wherein the reader is configured to receive the transaction data and to communicate a value based on the transaction data to the integrated circuit card,
    wherein the integrated circuit card is configured to generate, using the cryptogram application,
    an authentication cryptogram based on at least a portion of the value based on the transaction data and at least a portion of the customer-identifying data on the card,
    wherein the reader is further configured to read the authentication cryptogram and the bitmap from the card, to generate an authentication token comprising bits of the authentication cryptogram corresponding to the bitmap, and to communicate the authentication token to the customer's access device,
    wherein the customer's access device is configured to communicated the authentication token directly to the ACS,
    wherein the ACS is further configured to receive the authentication token directly from the customer's access device and communicate, to the ARS, the authentication token and the transaction data,
    wherein the ARS is further configured to generate a rebuilt cryptogram based on at least a same portion of a value based on the transaction data and at least a same portion of the customer-identifying data as used to generate the authentication cryptogram and to evaluate whether the authentication token matches bits of the rebuilt cryptogram corresponding to the bitmap validate the authentication token for authentication of the customer transaction.

2. The system of claim 1 wherein the transaction data communicated to the reader comprises a challenge based on the transaction information.

3. The system of claim 1 wherein the authentication token has a format that is compatible with 3-D Secure protocol message formats.

4. The system of claim 1 wherein the ACS is further configured to generate an Accountholder Authentication Value (AAV) upon successful evaluation of the authentication token by the ARS, wherein the AAV is transported on the electronic network in an Universal Cardholder Authentication Field which has a 20 byte length.

5. The system of claim 1 wherein the card and the reader are co-disposed in a single physical package.

6. The system of claim 1 wherein the access device, the card and the reader are co-disposed in a single physical package.

7. The system of claim 1 wherein the ARS is configured to evaluate customer-identifying data from the authentication token by first rebuilding the data used by the card to generate the cryptogram, next generating a replica cryptogram from rebuilt data, and then matching the authentication token with the replica cryptogram.

8. The system of claim 1, further comprising a cardholder database that can be accessed by ARS to retrieve stored customer information.

9. The system of claim 1 in which the ARS is further configured to communicate an authentication result to the requesting party.

10. The system of claim I wherein the ARS is further configured to match an application transaction counter received from the card against previous values of the application transaction counter received from the card and to accordingly authenticate the transaction.

11. The method of claim 1, wherein the ACS is configured to transmit the transaction data directly to the customer's access device and receive the authentication token directly from the customer's access device via a cardholder authentication page displayed at the cardholder's access device.

12. The method of claim 1, wherein the cardholder authentication page is displayed in a browser on the customer's access device.

13. The method of claim 1, wherein the ACS is configured to transmit the transaction data directly to the customer's access device and receive the authentication token directly from the customer's access device without authentication software downloads from the requesting party.

14. A method for authenticating a customer transaction on an electronic network, comprising:
  providing an integrated circuit card and a reader to the customer, the integrated circuit card having customer identification information, a cryptogram application, and a bitmap that is proprietary to an issuer of the integrated circuit card, the reader being linkable to a customer access device;
  receiving, at an access control server (ACS) linked to an electronic network, transaction information from a requesting party requesting authentication of the transaction, the ACS being remote from the customer access device;
  communicating the transaction data from the ACS directly to the customer access device over the electronic network;
  communicating the transaction data from the customer access device to the reader;
  receiving the transaction data at the reader and communicating a value based on the transaction data to the integrated circuit card;
  generating, using the cryptogram application at the integrated circuit card, an authentication cryptogram based on at least a portion of the value based on the transaction data and at least a portion of the customer-identifying data on the card;
  reading, at the reader, the authentication cryptogram and the bitmap from the card;
  generating, at the reader, an authentication token comprising bits of the authentication cryptogram corresponding to the bitmap;
  communicating the authentication token from the reader to the customer access device;
  communicating the authentication token from the customer access device directly to the ACS;
  receiving the authentication token at the ACS directly from the customer access device;
  communicating, from the ACS to an Authentication Request Server (ARS) linked to the electronic network, the authentication token and the transaction data, the ARS separately having the customer identification data and the bitmap;
  generating, at the ARS, a rebuilt cryptogram based on at least a same portion of a value based on the transaction data and at least a same portion of the customer-identifying data as used to generate the authentication cryptogram;
  evaluating, at the ARS, whether the authentication token matches bits of the rebuilt cryptogram corresponding to the bitmap to validate the authentication token for authentication of the customer transaction.

* * * * *